May 17, 1932.  G. LANGFORD  1,858,401
MEANS FOR SHEARING CONTINUOUS BARS
Filed April 13, 1929  3 Sheets-Sheet 3
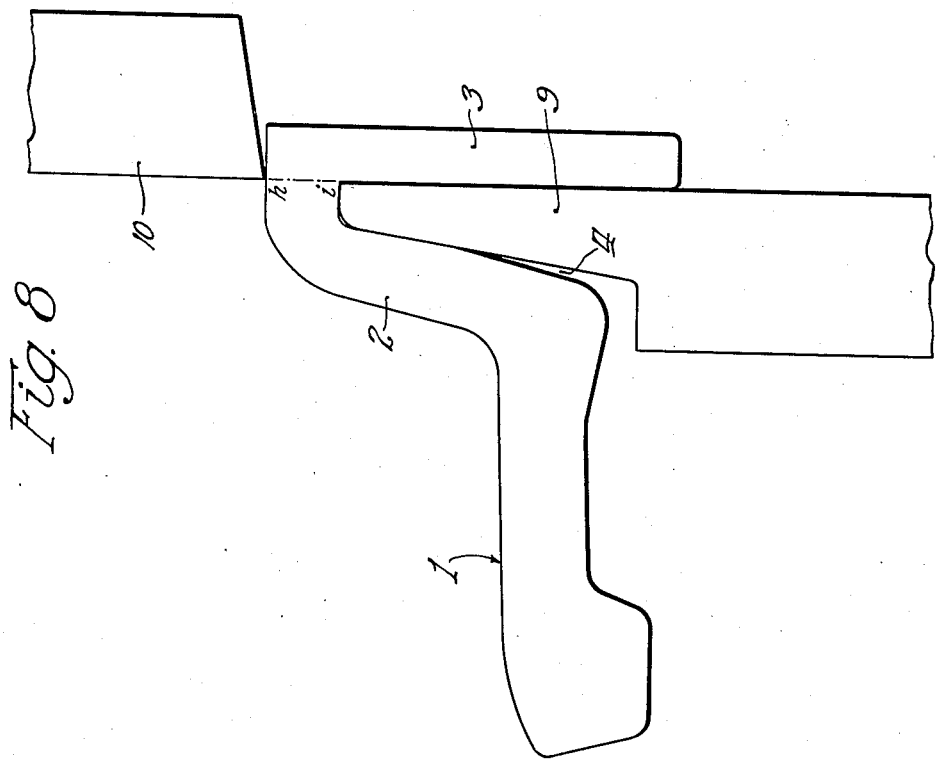
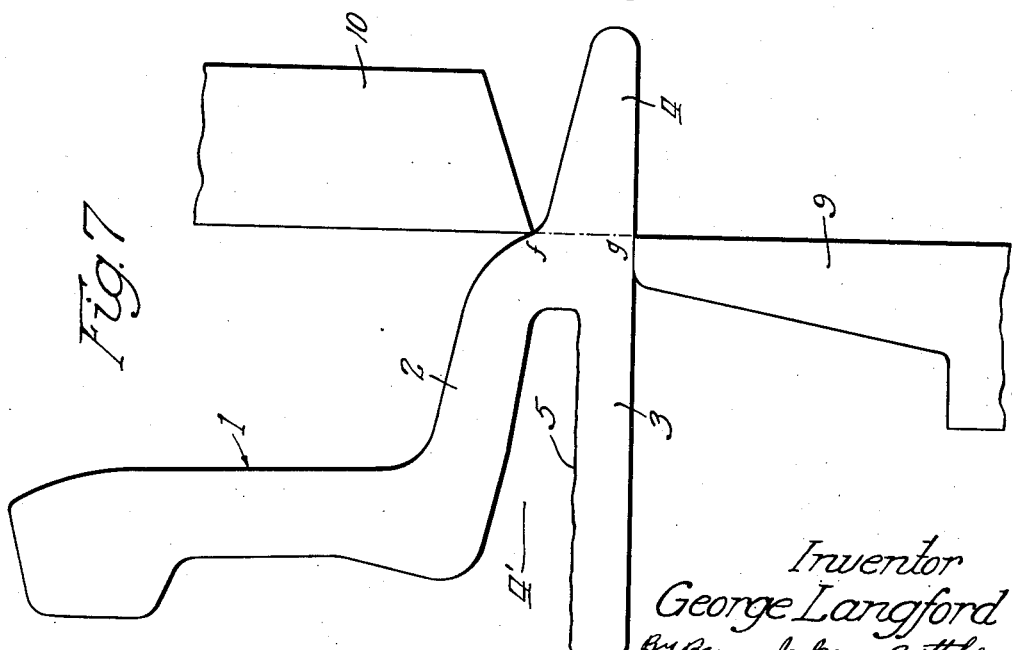
Inventor
George Langford Patented May 17, 1932

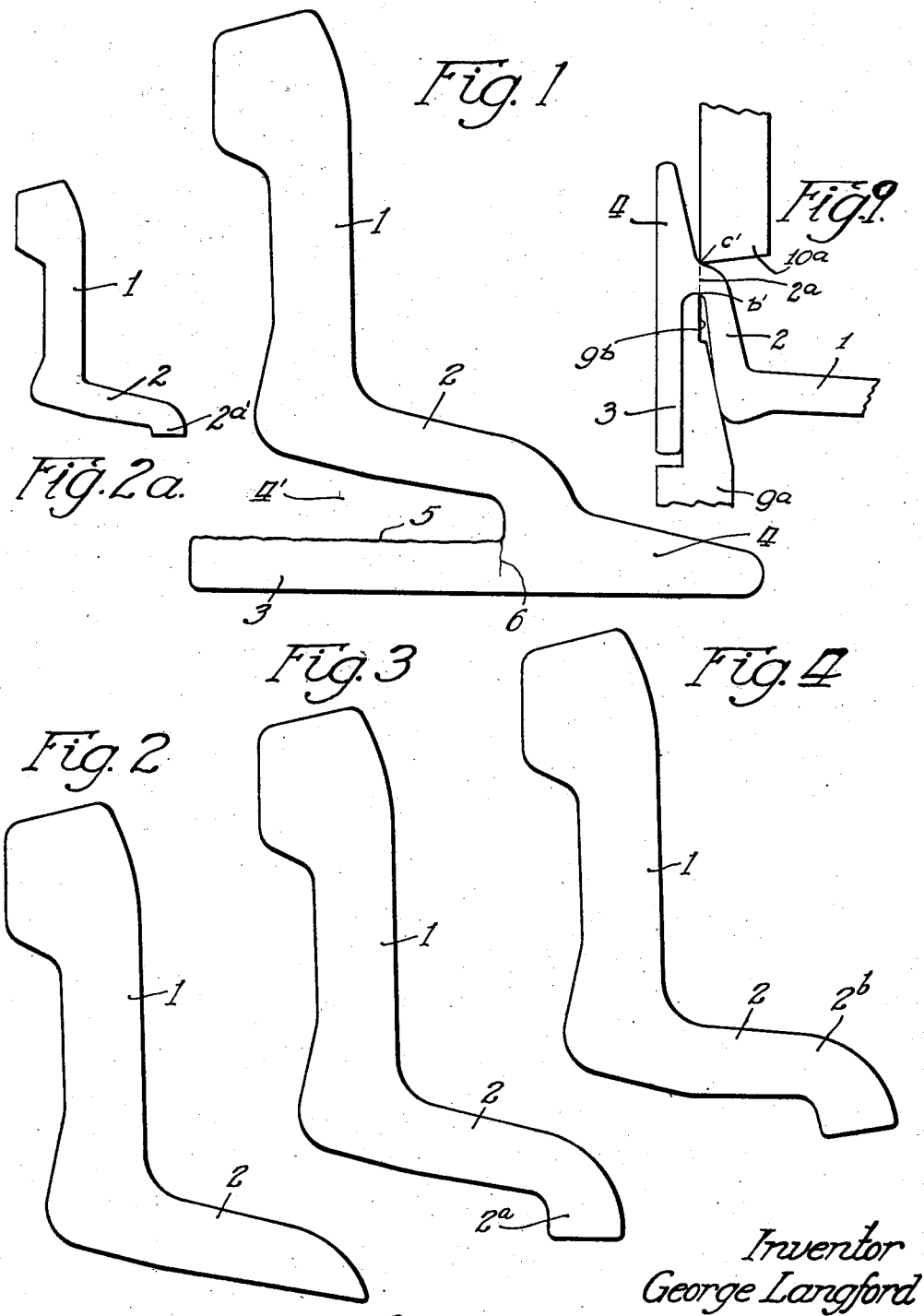

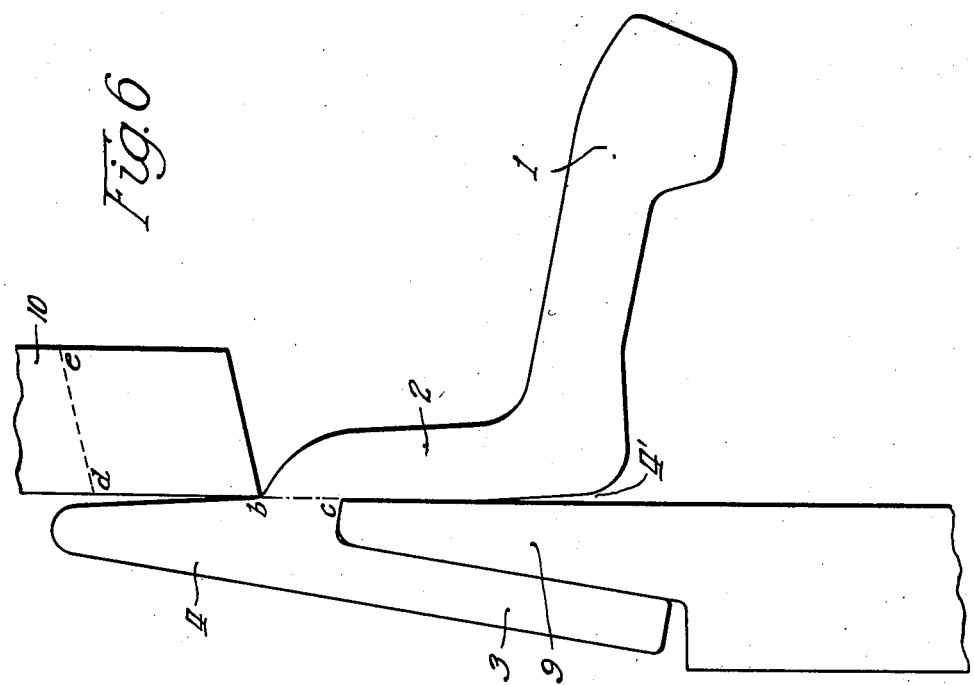
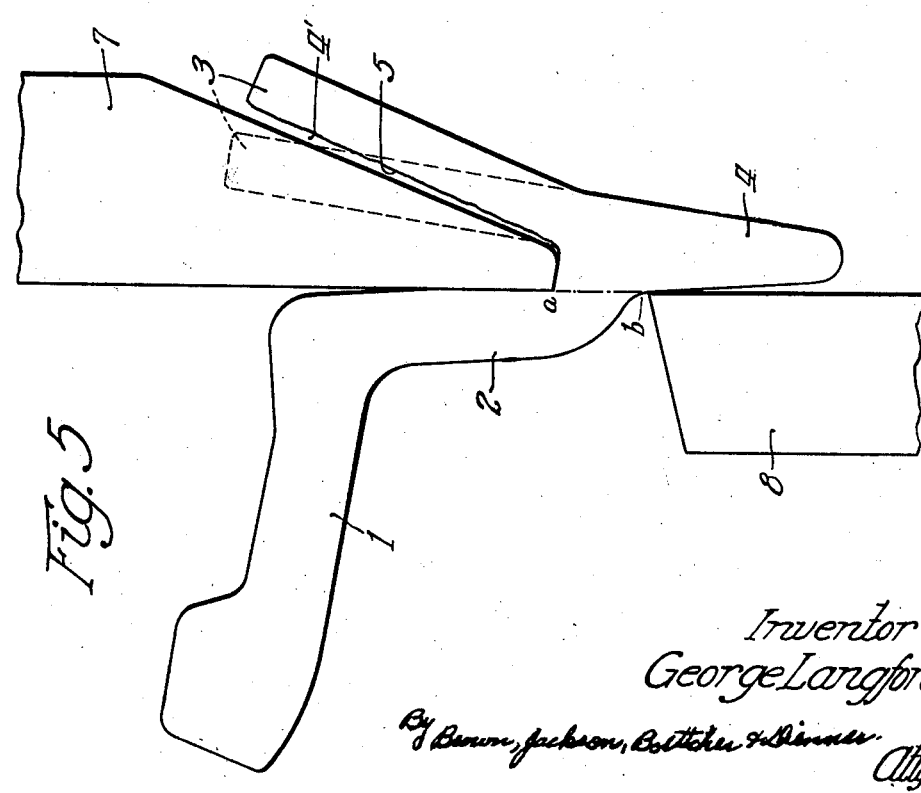

1,858,401

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

MEANS FOR SHEARING CONTINUOUS BARS

Application filed April 13, 1929. Serial No. 354,777.

My invention has to do with angle bars used for rail joints, and more particularly with what are termed "continuous bars".

Continuous bars are bars which are provided with a base portion which, when the bar is applied, extends beneath the base flange of the rail. After the bar has been is use for some time the base portion is badly corroded at the upper face thereof and, in many instances, is cracked along its line of juncture with the flange of the bar so that the retention of the base portion becomes undesirable. This portion is then sheared off and the bar may be reformed, being thus converted from a bar of the continuous type into a bar of the non-continuous type.

The shearing off of the base portion may be accomplished by shearing either hot or cold. This shearing operation is peculiarly difficult due to the thin space or gap between the base portion and the flange of the bar, such gap being provided for reception of the rail flange which fits snugly into this gap. To shear off the base of the bar requires, under the present practice, two operations. In the first operation the base is spread away from the flange so as to permit entry therebetween of a heavy or thick shearing blade. This is necessary when shearing is accordance with the present method because the movable blade of the shears enters between the flange and the base portion and if this blade were sufficiently thin to enter the relatively thin gap originally existing between the flange and the base portion, it would not have strength to effect the shearing of the base portion from the flange and would break. It is a known fact that in shearing operations the movable blade always receives more punishment than the fixed blade. Its cutting edge dulls more quickly and it is more liable to break than the fixed blade even where the two blades are exactly alike. In shearing the base portion of a continuous bar from the flange thereof, the difficulties referred to are increased by the fact that the bar cannot be held rigidly in alignment during the shearing operation.

I have found by extensive experiment that a thin shear blade placed in the upper moving position will soon fail from wear, bending or breakage, particularly when used for shearing bars of the character referred to.

I have also found, however, that this difficulty can be overcome by reversing the positions of the blades, using a strong and heavy blade in the upper moving position while placing the relatively thin in the lower fixed position. By this construction I am enabled to employ a lower blade which is sufficiently thin to enter the gap or space between the flange and the base portion of a continuous bar, which, when the bar is in use, snugly receives the flange of the rail. This lower blade corresponds in thickness to the rail flange and is so shaped as to snugly fit into the gap between the base and the flange of the bar. I thus avoid any necessity for the preliminary bending or spreading of the base of the bar, above referred to, rendering it possible to effect the shearing of the base from the flange in one operation instead of two operations as is the present practice. It is also possible, by providing the lower blade of proper size and shape to fit into the rail flange space of the bar, to utilize the shear blades themselves for accurately positioning the bar and holding it in proper alignment during the shearing operation. Under the present practice the bar, during the shearing operation, is disposed with the rail flange receiving space between the flange and the base opening upwardly, which renders it extremely difficult to hold the bar during the shearing operation. By my method I reverse the position of the bar and support it in proper position for shearing by the lower blade. The bar is thus held accurately during shearing and this bar also acts to materially brace the lower blade against bending or distortion during the shearing operation, since the bar fits snugly about this blade.

One of the main objects of my invention is to provide a method for shearing continuous bars in a single operation. A further object is to provide a method and means for practicing the same whereby a fixed lower blade of proper size and shape to enter the gap between the flange and base of a continuous bar can be employed, this blade coacting with a relatively heavy moving upper blade and the two blades being so related as to provide means for accurately positioning the bar and holding it during the shearing operation. Further objects and advantages of my invention will appear from the detailed description.

In the drawings:

Fig. 1 is an end view of a continuous bar which it is desired to convert into a non-continuous bar.

Figs. 2, 2a, 3 and 4 are end views showing variations of non-continuous bars produced from continuous bars such as the bar of Fig. 1, in accordance with my invention.

Fig. 5 is an end view of a continuous bar and a pair of shear blades illustrating one form of apparatus for shearing the base portion of the bar.

Fig. 6 is an end view of a continuous bar illustrating the relative positions of the bar and a pair of shear blades for shearing off the base in accordance with my preferred method.

Fig. 7 is an end view of a bar and a pair of shear blades illustrating a modification of my method for producing the bars of Figs. 3 and 4.

Fig. 8 is a view similar to Fig. 7 illustrating the second step of my method for producing the bars of Figs. 3 and 4.

Fig. 9 is an end view of a bar and shear blades for producing the bar of Fig. 2a.

In order that my invention may be more readily understood, and for purposes of comparison, I have illustrated in Fig. 1, in end view, a continuous type of bar, and, in Fig. 5, I have illustrated means for shearing the base member from such a bar. Referring to Fig. 1, the bar 1 is provided with a flange 2 which, when the bar is applied, has fishing contact with the upper surface of the rail flange. A base member 3 is integrally connected to the outer edge of flange 2 and projects inwardly from the same, this base member having an outwardly projecting point 4 of appreciable width.

Base member 3 defines with the flange 2 a relatively narrow tapered opening or gap 4', which, when the bar is applied, receives the flange of the rail with the upper face of base 3 in contact with the under face of the flange and the under face of flange 2 in fishing contact with the upper face of the rail flange. After such a bar has been in use for some time the upper face of base member 3 becomes badly corroded, as indicated at 5, and it frequently happens that the base member cracks at 6 along its line of juncture with the point 4. A continuous bar which is thus corroded and cracked is no longer fit for service but such a bar can be readily reformed into a non-continuous bar by shearing off the base member 3 and then reforming the bar so as to restore the fishing height and the fishing surfaces thereof.

In Fig. 5 I have illustrated a means for shearing off the base member 3. For effecting this shearing operation I employ a relatively thick and heavy upper moving blade 7 which enters between flange 2 and base member 3, and a lower thick blade 8. The upper blade 7 being the movable blade, it is necessary that it be heavy and thick to avoid breakage thereof and at the same time be thin enough at the cutting edge to enter the gap 4. It is necessary, therefore, to spread base member 3 from the dotted line position of Fig. 5, which corresponds to its normal position illustrated in Fig. 3, away from flange 2 into the full line position of Fig. 5. This spreading of the base member 3 may be done by a separate operation preliminary to the shearing operation to permit of greater thickness of the blade at the cutting edge to avoid breakage.

The bar 1 is positioned as in Fig. 5, with the opening between flange 2 and base member 3 directed upwardly, and the blade 7 enters between the flange and the base member and co-acts with blade 8 to shear the base member 3, including the point portion 4 thereof, off of the flange 2 along the line $a$—$b$. It will be noted that, with the bar 1 in the position illustrated, it is necessary that the bar be held during the shearing operation. It is extremely difficult, in practice, to hold the bar in such position and proper alignment thereof with the blade is impossible. Even with a heavy moving blade such as shown at 7, it may happen that the upper blade of the shear be broken due to the difficulty of properly holding the bar in position during the shearing operation. If a thick-pointed blade be used to avoid breakage, two operations are necessary to remove the base member 3, one operation being required to spread base member 3 away from flange 2 a proper distance to permit entry of the blade 7, and the second operation being the actual shearing or cutting off of the base member.

In Fig. 6 I have illustrated my method of shearing off the base member 3. I provide a relatively thin fixed lower blade 9 which is of proper thickness and shape to fit snugly into gap 4' between base member 3 and flange 2, this blade approximately corresponding in cross section to the flange of the rail. The bar 1 is disposed with the gap 4' opening downwardly, that is, in the reverse vision to that illustrated in Fig. 5.

The blade 9 cooperates with a relatively thick and heavy moving upper blade 10 for shearing member 3 and point 4 thereof off of flange 2 along the line $b$—$c$.

The up-stroke of the moving upper blade 10 is regulated so that the lower edge of this blade, when in its uppermost position, is at the line $d$—$e$. This line is below the top of point 4. With the blade 10 in raised position, bar 1 is readily positioned upon blade 9 by being placed thereon and then slid along the blade into full position thereon. In placing the bar upon blade 9, point 4 and flange 2 and base 3 of the bar cooperate with blades 10 and 9, respectively, to guide the bar and facilitate positioning thereof on the lower blade. The bar is thus quickly and accurately positioned upon blade 9 effecting a material saving in time. When so positioned the upper surface of extension or point 4 of base member 3, that is, the surface of the point towards blade 10, is in contact with the adjacent surface of the blade over an appreciable area. This area of contact is disposed above the line along which the shearing operation starts so that tilting of the bar during shearing is largely counteracted by this contact between blade 10 and point 4. This assures accurate alignment of the bar with the blade during the shearing operation. A further important feature of my invention is that the lower blade 9 fits snugly between the base member 3 and the flange 2 and is braced or reinforced thereby during the shearing operation, thus avoiding liability of breakage of this blade. I have found, however, that in shearing operations the greatest stresses are imposed upon the moving upper blade, and the fixed lower blade can be much lighter than the upper blade without danger of breakage.

This fact, combined with the bracing or reinforcing action of the bar, renders it possible to shear continuous bars to remove the base members thereof in a single operation by using a blade sufficiently thin and so shaped as to enter into the space between the flange and the base member without spreading the base member away from the flange, thus rendering it possible to effect this shearing in a single operation. This is a material saving both in time and labor over the present practice which requires two separate operations for shearing the base member from the flange of a continuous bar.

After the base member has been sheared from the bar, this bar may be reformed in dies, or in any other suitable manner, to give the bar of Fig. 2, this being a non-continuous bar well adapted for use in rail joints of present day construction.

It is frequently desirable to strengthen the flange 2 of the bar of Fig. 2. This may be readily accomplished by removing point 4 of the continuous bar by shearing, and then removing base member 3 by shearing along the plane of the upper face of this member. In Fig. 7 I have illustrated the first step of this method in which point 4 is removed by shearing along the line $f$—$g$. During this operation the bar is held in upright position with the base member 3 horizontal. After the point 4 has been sheared off, the bar is then placed upon the lower blade 9 in the position illustrated in Fig. 8, and base member 3 is sheared off along the line $h$—$i$, that is, in the plane of the upper face of base member 3. This produces the bar of Fig. 3 in which the flange 2 is provided, at its outer edge, with a depending reinforcing element or toe $2a$.

In some instances this toe is objectionable as it encounters the shoulder of the tie plate. This is avoided by bending the flange 2 upwardly as at $2b$, producing the bar of Fig. 4. This bending of the flange is effected in the dies during reforming of the bar, it being understood that the bars of Figs. 3 and 4, as well as the bar of Fig. 2, are reformed in a suitable manner, as by means of dies, after the shearing operation to remove the base member 3 has been completed.

The bar of Fig. $2a$ is similar to that of Fig. 2 except that the toe $2a'$ is of less vertical height than toe $2a$. This bar is produced by shearing off the base 3 along line $b'$—$c'$, by means of the shear blades $9a$ and $10a$, as in Fig. 9. As will be noted, the inner face of the blade $9a$ is recessed or off-set outwardly at $9b$ and line $b'$—$c'$ is spaced from the under face of flange 2. This produces a toe $2a'$ of less vertical height than toe $2a$ of the bar of Fig. 2.

What I claim is:

1. In shearing means for shearing off the base of a continuous type of rail joint bar for converting it into a non-continuous type of bar, a lower fixed shear blade for disposal between the flange and the base of the bar, and shaped to hold and position the bar thereon, and an upper moving blade co-operating with said lower blade to shear off the base of the bar while said flange and said base are in normal relation to each other.

2. In a shearing means for shearing off the base of a continuous type of rail joint bar and converting it into a non-continuous type of bar, a lower fixed shear blade with one face substantially vertical and the other face sloping so that said lower blade will conform to the recess between the flange and base of the bar so as to hold and position the bar thereon, and an upper moving blade co-operating with said lower blade to shear off the base of the bar while said flange and said base are in normal relation to each other.

In witness whereof, I hereunto subscribe my name this 1st day of April, 1929.

GEORGE LANGFORD.